United States Patent
Babcock et al.

(10) Patent No.: US 9,446,340 B2
(45) Date of Patent: Sep. 20, 2016

(54) AIR FILTER CARTRIDGE

(75) Inventors: Brian D. Babcock, Bloomington, MN (US); Heather M. Tate, Shakopee, MN (US); Mark D. Belcher, Burnsville, MN (US); Brain Zauner, Lakeville, MN (US); Kyle W. Undesser, Shakopee, MN (US); Douglas A. Wersal, Champlin, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 380 days.

(21) Appl. No.: 13/123,032

(22) PCT Filed: Nov. 6, 2009

(86) PCT No.: PCT/US2009/063581
§ 371 (c)(1),
(2), (4) Date: Jul. 1, 2011

(87) PCT Pub. No.: WO2010/054218
PCT Pub. Date: May 14, 2010

(65) Prior Publication Data
US 2011/0252758 A1    Oct. 20, 2011

Related U.S. Application Data

(60) Provisional application No. 61/112,525, filed on Nov. 7, 2008.

(51) Int. Cl.
*B01D 46/52* (2006.01)
*B01D 46/42* (2006.01)

(52) U.S. Cl.
CPC ......... *B01D 46/525* (2013.01); *B01D 46/4209* (2013.01); *B01D 2201/50* (2013.01)

(58) Field of Classification Search
CPC ............ B01D 46/4209; B01D 46/521; B01D 46/525; B01D 46/526; B01D 46/527; B01D 2201/50
USPC .......................................... 55/486, 521, 524
See application file for complete search history.

(56) References Cited

U.S. PATENT DOCUMENTS

| 3,713,280 A | 1/1973 | Keller et al. |
| 3,986,530 A | 10/1976 | Maekawa |
| 4,322,232 A | 3/1982 | Beane |
| 4,531,957 A | 7/1985 | Malik |
| 4,606,968 A | 8/1986 | Thornton et al. |

(Continued)

FOREIGN PATENT DOCUMENTS

| WO | WO 87/01301 | 3/1987 |
| WO | WO 8701301 A1 * | 3/1987 |

(Continued)

*Primary Examiner* — Robert Clemente
(74) *Attorney, Agent, or Firm* — Merchant & Gould P.C.

(57) ABSTRACT

Filters capable of dissipating static charges. One example includes a filter media pack comprising fluted media secured to facing media; the fluted media having cellulose fibers; and the fluted media including an amount of carbon black sufficient to impart a static charge dissipative property thereto. One example includes an air filter cartridge having a filter media pack comprising fluted media secured to facing media; the fluted media comprising cellulose fibers; the fluted media having at least one side coated with a static charge dissipative amount of a metallic coating. These filters are useable in, for example, dust collectors.

4 Claims, 12 Drawing Sheets

(56) References Cited

U.S. PATENT DOCUMENTS

| | | | |
|---|---|---|---|
| 4,854,230 A * | 8/1989 | Niki et al. | 101/123 |
| 5,213,882 A * | 5/1993 | Sassa et al. | 442/414 |
| 5,229,200 A * | 7/1993 | Sassa et al. | 442/57 |
| 5,324,579 A * | 6/1994 | Sassa et al. | 442/324 |
| 5,527,569 A * | 6/1996 | Hobson et al. | 428/35.2 |
| 6,099,726 A * | 8/2000 | Gembolis et al. | 210/243 |
| 6,746,517 B2 | 6/2004 | Benson et al. | |
| 7,022,630 B2 * | 4/2006 | Berman et al. | 442/365 |
| 7,396,376 B2 * | 7/2008 | Schrage et al. | 55/498 |
| 7,927,400 B2 * | 4/2011 | Graber et al. | 95/59 |
| 7,964,012 B2 * | 6/2011 | Choi et al. | 55/524 |
| 8,080,086 B2 * | 12/2011 | Graber et al. | 95/59 |
| 8,277,532 B2 * | 10/2012 | Reichter et al. | 55/502 |
| 2001/0053647 A1 * | 12/2001 | Bugnet et al. | 442/231 |
| 2004/0211163 A1 * | 10/2004 | Faulkner et al. | 55/486 |
| 2005/0060972 A1 | 3/2005 | Gieseke et al. | |
| 2007/0028767 A1 | 2/2007 | Choi et al. | |
| 2007/0048509 A1 * | 3/2007 | Yoneyama et al. | 428/212 |
| 2008/0230464 A1 | 9/2008 | Winstrup et al. | |
| 2009/0078637 A1 * | 3/2009 | Shane | 210/243 |
| 2010/0314333 A1 * | 12/2010 | Witsch et al. | 210/767 |
| 2011/0265312 A1 * | 11/2011 | Choi et al. | 29/592.1 |

FOREIGN PATENT DOCUMENTS

| | | |
|---|---|---|
| WO | WO 01/37970 A1 | 5/2001 |
| WO | WO 0137970 A1 * | 5/2001 |

* cited by examiner

AIR FILTER CARTRIDGE

CLAIM OF PRIORITY

This application is being filed on 7 Apr. 2010, as a US National Stage of PCT International Patent application No. PCT/US2009/063581, filed 6 Nov. 2009 in the name of Donaldson Company, Inc., a U.S. national corporation, applicant for the designation of all countries except the U.S., and Brian D. Babcock, a citizen of the U.S., Heather M. Tate, a citizen of the U.S., Mark D. Belcher, a citizen of the U.S., Brian Zauner, a citizen of the U.S., Kyle W. Undesser, a citizen of the U.S., and Doug A. Wersal, a citizen of the U.S., applicants for the designation of the U.S. only, and which claims benefit of U.S. Provisional Patent Application Ser. No. 61/112,525 filed on 7 Nov. 2008 and which applications are incorporated herein by reference. To the extent appropriate, a claim of priority is made to each of the above disclosed applications.

FIELD OF THE DISCLOSURE

The present disclosure concerns filters for cleaning air, for example, for use in dust collectors and other equipment. In particular, this disclosure concerns filters capable of dissipating static charges

BACKGROUND

Fine particulates can present an explosion hazard due to build-up of electrical charges. Control of static electricity is needed in industrial settings where an uncontrolled electrostatic discharge (ESD) or spark can result in damage. For example, static discharges can bring about the destruction of integrated circuits during some stages of their manufacture. In explosive environments, such as in grain elevators, or in flammable environments, such as on oil drilling rigs, in refineries, and in solvent-based processes, a static discharge can be extremely dangerous and must be prevented in order to safeguard life and property.

Typical ways for controlling static electric charges include external devices on the filter housing and apparatus to carry electrical charges found on the textile material to ground (e.g., grounding straps or wire). Another approach is to apply a coating of metals or of conductive carbon to the outside surface of fibers used in producing organic polymeric textile material. However, if the coating used is not as flexible as the fiber on which it is placed, flexing of the fiber may cause cracks in the coating that may interrupt or destroy the conductive pathway formed by the coating. Still another strategy to drain off static charges is to produce textile materials incorporating conductive fibers into a matrix of nonwoven filtration media.

Conductive media and filter elements are taught in several patents and publications. U.S. Pat. No. 6,099,726 teaches a static dissipating filter cartridge that uses conductive materials. The filters described are pleated filters with a steel mesh supporting a filtration media where the filter media provide particulate efficiency while the steel mesh provides conductivity. U.S. Pat. No. 5,527,569 teaches a conductive filter laminate using a microporous membrane with electrically conductive particles embedded in it. PCT publication WO 01/37970 to Adilaetta et al teaches a porous media for dissipating electrical charges, primarily for use in filtering hydrocarbon liquids.

Methods for manufacturing conductive and/or static dissipative media can vary along with the composition of the media. Specific production methods and compositions for filter media are described in US Publication US 2007/0028767 to Choi and Soper which is herein incorporated by reference.

Improvements for media and filter element designed to control static electrical charges are desired.

SUMMARY OF THE DISCLOSURE

Filters are described that are capable of dissipating static charges. In an embodiment, a filter media pack is provided comprising fluted media secured to facing media wherein the fluted media comprises cellulose fibers and a dissipative material to impart a static charge dissipative property onto the media. In an embodiment, the dissipative material is carbon black. In another embodiment, the dissipative material is a metallic coating, such as aluminum. The dissipative material may be disposed within the fluted media or coated upon the media and may be present on one side or both sides of the media. Additionally, the media may contain electrically conductive fibers, less than 5% electrically conductive fibers by weight, or no electrically conductive fibers. A layer of nanofibers may also be placed onto the fluted media or onto the dissipative material. In an embodiment, the fluted media is provided with on or both sides having a surface resistivity of less than $1\times10^9$ ohms/square. In an embodiment, the filter media pack is constructed with an efficiency at least 60%, for 0.76 micron particles at a face velocity of 20 feet/min. In an embodiment, the filter includes at least 70% cellulose fibers by weight. In an embodiment, the fluted media has a thickness that is no more than 0.020 inches. It is noted that not all the specific features described herein need to be incorporated in an arrangement for the arrangement to have some selected advantage according to the present disclosure.

DETAILED DESCRIPTION

I. Z-Filter Media Configurations, Generally

Figure 1:
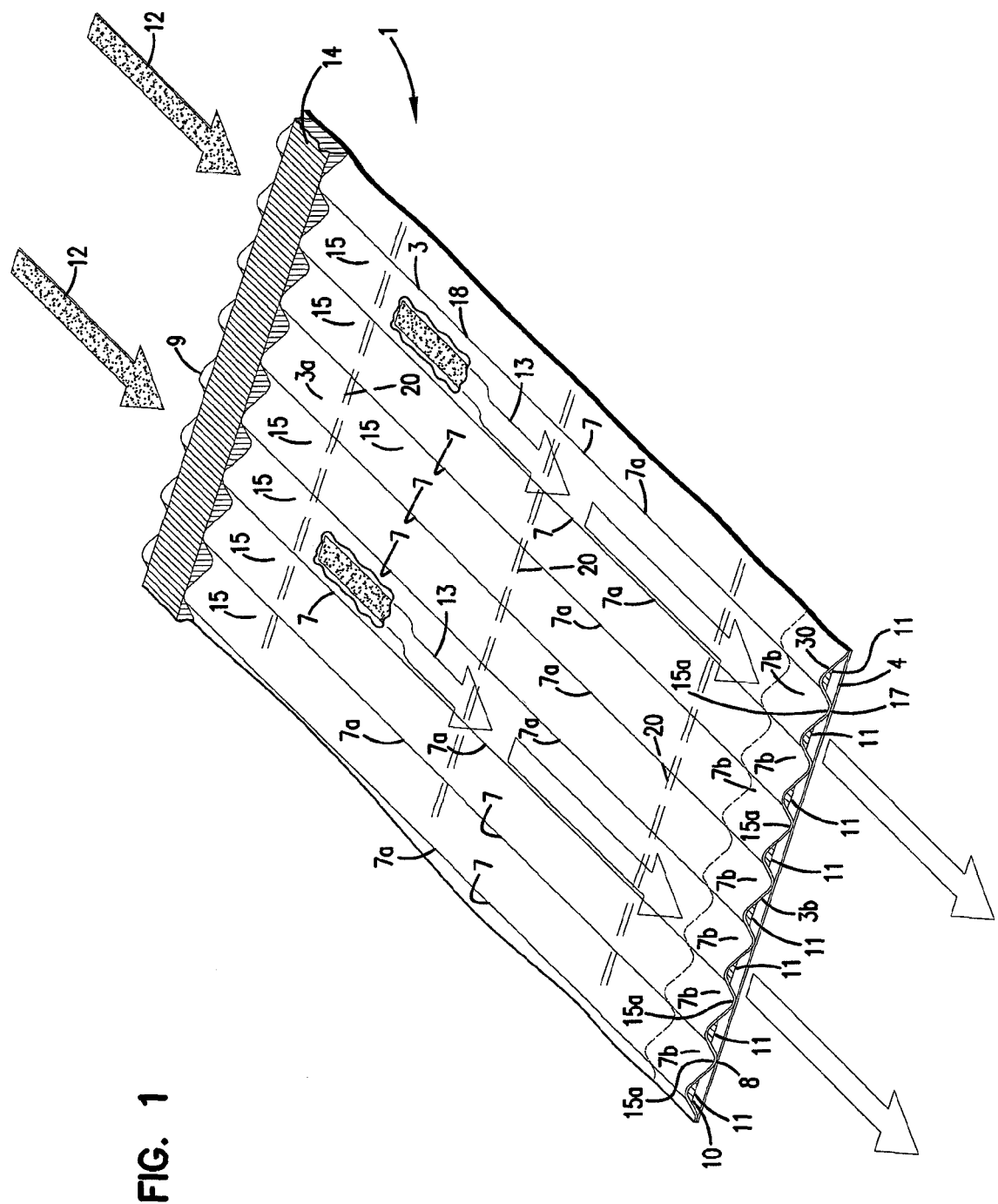
FIG. 1 is a fragmentary, schematic, perspective view of a single facer strip of z-filter media comprising a fluted sheet secured into a facing sheet.

Fluted filter media can be used to provide fluid filter constructions in a variety of manners. One well known manner is as a z-filter construction. The term "z-filter construction" as used herein, is meant to refer to a filter construction in which individual ones of corrugated, folded or otherwise formed filter flutes are used to define sets of longitudinal filter flutes for fluid flow through the media; the fluid flowing along the length of the flutes between opposite inlet and outlet flow ends (or flow faces) of the media. Some examples of z-filter media are provided in U.S. Pat. Nos. 5,820,646; 5,772,883; 5,902,364; 5,792,247; 5,895,574; 6,210,469; 6,190,432; 6,350,296; 6,179,890; 6,235,195; Des. 399,944; Des. 428,128; Des. 396,098; Des. 398,046; and, Des. 437,401; each of these fifteen cited references being incorporated herein by reference.

One type of z-filter media utilizes two specific media components joined together, to form the media construction. The two components are: (1) a fluted (typically corrugated) media sheet; and, (2) a facing media sheet. The facing media sheet is typically non-corrugated, however it can be corrugated, for example perpendicularly to the flute direction as described in U.S. provisional 60/543,804, filed Feb. 11, 2004, incorporated herein by reference.

The fluted (typically corrugated) media sheet and the facing media sheet, together, are used to define media having parallel inlet and outlet flutes; i.e. opposite sides of the fluted sheet operable as inlet and outlet flow regions. In some instances, the fluted sheet and non-fluted sheet are secured together and are then coiled to form a z-filter media construction. Such arrangements are described, for example, in U.S. Pat. Nos. 6,235,195 and 6,179,890, each of which is incorporated herein by reference. In certain other arrangements, some non-coiled sections of fluted media secured to flat media, are stacked on one another, to create a filter construction. An example of this is described in FIG. 11 of U.S. Pat. No. 5,820,646, incorporated herein by reference.

Typically, coiling of the fluted sheet/facing sheet combination around itself, to create a coiled media pack, is conducted with the facing sheet directed outwardly. Some techniques for coiling are described in U.S. provisional application 60/467,521, filed May 2, 2003 and PCT Application US 04/07927, filed Mar. 17, 2004, published Sep. 30, 2004 as WO 2004/082795, incorporated herein by reference. The resulting coiled arrangement generally has, as the outer surface of the media pack, a portion of the facing sheet, as a result. In some instances a protective covering can be provided around the media pack.

The term "corrugated" when used herein to refer to structure in media, is meant to refer to a flute structure resulting from passing the media between two corrugation rollers, i.e., into a nip or bite between two rollers, each of which has surface features appropriate to cause a corrugation affect in the resulting media. The term "corrugation" is not meant to refer to flutes that are formed by techniques not involving passage of media into a bite between corrugation rollers. However, the term "corrugated" is meant to apply even if the media is further modified or deformed after corrugation, for example by the folding techniques described in PCT WO 04/007054, published Jan. 22, 2004, incorporated herein by reference.

Corrugated media is a specific form of fluted media. Fluted media is media which has individual flutes (for example formed by corrugating or folding) extending thereacross.

Serviceable filter element or filter cartridge configurations utilizing z-filter media are sometimes referred to as "straight through flow configurations" or by variants thereof. In general, in this context what is meant is that the serviceable filter elements generally have an inlet flow end (or face) and an opposite exit flow end (or face), with flow entering and exiting the filter cartridge in generally the same straight through direction. (The term "straight through flow configuration" disregards, for this definition, any air flow that passes out of the media pack through the outermost wrap of facing media.) The term "serviceable" in this context is meant to refer to a media containing filter cartridge that is periodically removed and replaced from a corresponding air cleaner. In some instances, each of the inlet flow end and outlet flow end will be generally flat or planar, with the two parallel to one another. However, variations from this, for example non-planar faces are possible.

In general, the media pack includes appropriate seal material therein, to ensure there is no unfiltered flow of air through the media pack, in extension from front flow face (an inlet flow face) completely through and outwardly from opposite oval face (outlet flow face).

A straight through flow configuration (especially for a coiled media pack) is, for example, in contrast to serviceable filter cartridges such as cylindrical pleated filter cartridges of the type shown in U.S. Pat. No. 6,039,778, incorporated herein by reference, in which the flow generally makes a turn as its passes through the serviceable cartridge. That is, in a U.S. Pat. No. 6,039,778 filter, the flow enters the cylindrical filter cartridge through a cylindrical side, and then turns to exit through an end face (in forward-flow systems). In a typical reverse-flow system, the flow enters the serviceable cylindrical cartridge through an end face and then turns to exit through a side of the cylindrical filter cartridge. An example of such a reverse-flow system is shown in U.S. Pat. No. 5,613,992, incorporated by reference herein.

The term "z-filter media construction" and variants thereof as used herein, without more, is meant to refer to any or all of: a web of corrugated or otherwise fluted media secured to (facing) media with appropriate sealing to inhibit air flow from one flow face to another without filtering passage through the filter media; and/or, such a media coiled or otherwise constructed or formed into a three dimensional network of flutes; and/or, a filter construction including such media. In many arrangements, the z-filter media construction is configured for the formation of a network of inlet and outlet flutes, inlet flutes being open at a region adjacent an inlet face and being closed at a region adjacent an outlet face; and, outlet flutes being closed adjacent an inlet face and being open adjacent an outlet face. However, alternative z-filter media arrangements are possible, see for example US 2006/0091084 A1, published May 4, 2006, incorporated herein by reference; also comprising flutes extending between opposite flow faces, with a seal arrangement to prevent flow of unfiltered air through the media pack.

In FIG. 1 herein, an example of media 1 useable in z-filter media is shown. The media 1 is formed from a fluted (corrugated) sheet 3 and a facing sheet 4. Herein, a strip of media comprising fluted sheet secured to facing sheet will sometimes be referred to as a single facer strip, or by similar terms.

In general, the corrugated sheet 3, FIG. 1 is of a type generally characterized herein as having a regular, curved, wave pattern of flutes or corrugations 7. The term "wave pattern" in this context, is meant to refer to a flute or corrugated pattern of alternating troughs 7b and ridges 7a. The term "regular" in this context is meant to refer to the fact that the pairs of troughs and ridges (7b, 7a) alternate with generally the same repeating corrugation (or flute) shape and size. (Also, typically in a regular configuration each trough 7b is substantially an inverse of each ridge 7a.) The term "regular" is thus meant to indicate that the corrugation (or flute) pattern comprises troughs and ridges with each pair (comprising an adjacent trough and ridge) repeating, without substantial modification in size and shape of the corrugations along at least 70% of the length of the flutes. The term "substantial" in this context, refers to a modification resulting from a change in the process or form used to create the corrugated or fluted sheet, as opposed to minor variations from the fact that the media sheet 3 is flexible. With respect to the characterization of a repeating pattern, it is not meant that in any given filter construction; an equal number of ridges and troughs are necessarily present. The media 1 could be terminated, for example, between a pair comprising a ridge and a trough, or partially along a pair comprising a ridge and a trough. (For example, in FIG. 1 the media 1 depicted in fragmentary has eight complete ridges 7a and seven complete troughs 7b.) Also, the opposite flute ends (ends of the troughs and ridges) may vary from one another. Such variations in ends are disregarded in these definitions, unless specifically stated. That is, variations in the ends of flutes are intended to be covered by the above definitions.

In the context of the characterization of a "curved" wave pattern of corrugations, the term "curved" is meant to refer to a corrugation pattern that is not the result of a folded or creased shape provided to the media, but rather the apex 7a of each ridge and the bottom 7b of each trough is formed along a radiused curve. Although alternatives are possible, a typical radius for such z-filter media would be at least 0.25 mm and typically would be not more than 3 mm. (Media that is not curved, by the above definition, can also be useable.)

An additional characteristic of the particular regular, curved, wave pattern depicted in FIG. 1, for the corrugated sheet 3, is that at approximately a midpoint 30 between each trough and each adjacent ridge, along most of the length of the flutes 7, is located a transition region where the curvature inverts. For example, viewing back side or face 3a, FIG. 1, trough 7b is a concave region, and ridge 7a is a convex region. Of course when viewed toward front side or face 3b, trough 7b of side 3a forms a ridge; and, ridge 7a of face 3a, forms a trough. (In some instances, region 30 can be a straight segment, instead of a point, with curvature inverting at ends of the segment 30.)

A characteristic of the particular regular, curved, wave pattern corrugated sheet 3 shown in FIG. 1, is that the individual corrugations are generally straight. By "straight" in this context, it is meant that through at least 70% (typically at least 80%) of the length between edges 8 and 9, the ridges 7a and troughs 7b do not change substantially in cross-section. The term "straight" in reference to corrugation pattern shown in FIG. 1, in part distinguishes the pattern from the tapered flutes of corrugated media described in FIG. 1 of WO 97/40918 and PCT Publication WO 03/47722, published Jun. 12, 2003, incorporated herein by reference. The tapered flutes of FIG. 1 of WO 97/40918, for example, would be a curved wave pattern, but not a "regular" pattern, or a pattern of straight flutes, as the terms are used herein.

Referring to the present FIG. 1 and as referenced above, the media 1 has first and second opposite edges 8 and 9. When the media 1 is coiled and formed into a media pack, in general edge 9 will form an inlet end for the media pack and edge 8 an outlet end, although an opposite orientation is possible.

In the example shown, adjacent edge 8 is provided sealant, in this instance in the form of a sealant bead 10, sealing the corrugated (fluted) sheet 3 and the facing sheet 4 together. Bead 10 will sometimes be referred to as a "single facer" bead, since it is a bead between the corrugated sheet 3 and facing sheet 4, which forms the single facer or media strip 1. Sealant bead 10 seals closed individual flutes 11 adjacent edge 8, to passage of air therefrom.

In the example shown, adjacent edge 9, is provided sealant, in this instance in the form of a seal bead 14. Seal bead 14 generally closes flutes 15 to passage of unfiltered fluid therein, adjacent edge 9. Bead 14 would typically be applied as the media 1 is coiled about itself, with the corrugated sheet 3 directed to the inside. Thus, bead 14 will form a seal between a back side 17 of facing sheet 4, and side 18 of the corrugated sheet 3. The bead 14 will sometimes be referred to as a "winding bead" since it is typically applied, as the strip 1 is coiled into a coiled media pack. If the media 1 is cut in strips and stacked, instead of coiled, bead 14 would be a "stacking bead."

Referring to FIG. 1, once the media 1 is incorporated into a media pack, for example by coiling or stacking, it can be operated as follows. First, air in the direction of arrows 12, would enter open flutes 11 adjacent end 9. Due to the closure at end 8, by bead 10, the air would pass through the media shown by arrows 13. It could then exit the media pack, by passage through open ends 15a of the flutes 15, adjacent end 8 of the media pack. Of course operation could be conducted with air flow in the opposite direction.

In more general terms, z-filter media comprises fluted filter media secured to facing filter media, and configured in a media pack of flutes extending between first and second opposite flow faces. A sealant arrangement is provided within the media pack, to ensure that air entering flutes at a first upstream edge cannot exit the media pack from a downstream edge, without filtering passage through the media.

For the particular arrangement shown herein in FIG. 1, the parallel corrugations 7a, 7b are generally straight completely across the media, from edge 8 to edge 9. Straight flutes or corrugations can be deformed or folded at selected locations, especially at ends. Modifications at flute ends for closure are generally disregarded in the above definitions of "regular," "curved" and "wave pattern."

Z-filter constructions which do not utilize straight, regular curved wave pattern corrugation (flute) shapes are known. For example in Yamada et al. U.S. Pat. No. 5,562,825 corrugation patterns which utilize somewhat semicircular (in cross section) inlet flutes adjacent narrow V-shaped (with curved sides) exit flutes are shown (see FIGS. 1 and 3, of U.S. Pat. No. 5,562,825). In Matsumoto, et al. U.S. Pat. No. 5,049,326 circular (in cross-section) or tubular flutes defined by one sheet having half tubes attached to another sheet having half tubes, with flat regions between the resulting parallel, straight, flutes are shown, see FIG. 2 of Matsumoto '326. In Ishii, et al. U.S. Pat. No. 4,925,561 (FIG. 1) flutes folded to have a rectangular cross section are shown, in which the flutes taper along their lengths. In WO 97/40918 (FIG. 1), flutes or parallel corrugations which have a curved, wave patterns (from adjacent curved convex and concave troughs) but which taper along their lengths (and thus are not straight) are shown. Also, in WO 97/40918 flutes which have curved wave patterns, but with different sized ridges and troughs, are shown.

In general, the filter media is a relatively flexible material, typically a non-woven fibrous material (of cellulose fibers, synthetic fibers or both) often including a resin therein, sometimes treated with additional materials. Thus, it can be conformed or configured into the various corrugated patterns, without unacceptable media damage. Also, it can be readily coiled or otherwise configured for use, again without unacceptable media damage. Of course, it must be of a nature such that it will maintain the required corrugated configuration, during use.

In the corrugation process, an inelastic deformation is caused to the media. This prevents the media from returning to its original shape. However, once the tension is released the flute or corrugations will tend to spring back, recovering only a portion of the stretch and bending that has occurred. The facing sheet is sometimes tacked to the fluted sheet, to inhibit this spring back in the corrugated sheet.

Also, typically, the media contains a resin. During the corrugation process, the media can be heated to above the glass transition point of the resin. When the resin then cools, it will help to maintain the fluted shapes.

The media of the corrugated sheet 3 facing sheet 4 or both, can be provided with a fine fiber material on one or both sides thereof, for example in accord with U.S. Pat. No. 6,673,136, incorporated herein by reference.

An issue with respect to z-filter constructions relates to closing of the individual flute ends. Typically a sealant or adhesive is provided, to accomplish the closure. As is apparent from the discussion above, in typical z-filter media especially those which use straight flutes as opposed to tapered flutes, large sealant surface areas (and volume) at both the upstream end and the downstream end are needed. High quality seals at these locations are critical to proper operation of the media structure that results. The high sealant volume and area, creates issues with respect to this.

Still referring to FIG. 1, at 20 tack beads are shown positioned between the corrugated sheet 3 and facing sheet 4, securing the two together. The tack beads can be for example, discontinuous lines of adhesive. The tack beads can also be points in which the media sheets are welded together.

From the above, it will be apparent that the corrugated sheet 3 is typically not secured continuously to the facing sheet, along the troughs or ridges where the two adjoin. Thus, air can flow between adjacent inlet flutes, and alternately between the adjacent outlet flutes, without passage through the media. However air which has entered in inlet flute cannot exit from an outlet flute, without passing through at least one sheet of media, with filtering.

Figure 2:
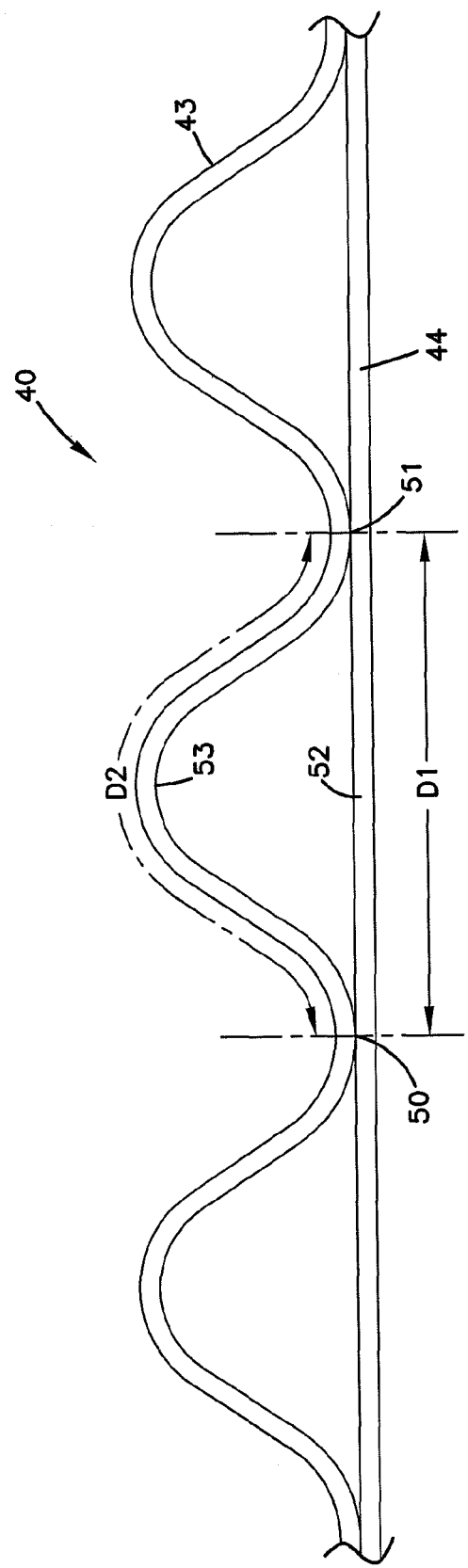
FIG. 2 is an enlarged, schematic, fragmentary view of a single facer sheet comprising fluted media secured to facing media.

Attention is now directed to FIG. 2, in which a z-filter media construction 40 utilizing a fluted (in this instance regular, curved, wave pattern corrugated) sheet 43, and a non-corrugated flat, facing, sheet 44, is depicted. The distance D1, between points 50 and 51, defines the extension of flat media 44 in region 52 underneath a given corrugated flute 53. The length D2 of the arch-shaped media for the corrugated flute 53, over the same distance D1 is of course larger than D1, due to the shape of the corrugated flute 53.

For a typical regular shaped media used in fluted filter applications, the linear length D2 of the media 53 between points 50 and 51 will generally be at least 1.2 times D1. Typically, D2 would be within a range of 1.2-2.0, inclusive. One particularly convenient arrangement for air filters has a configuration in which D2 is about 1.25-1.35×D1. Such media has, for example, been used commercially in Donaldson Powercore™ Z-filter arrangements. Herein the ratio D2/D1 will sometimes be characterized as the flute/flat ratio or media draw for the corrugated media.

Figure 3:
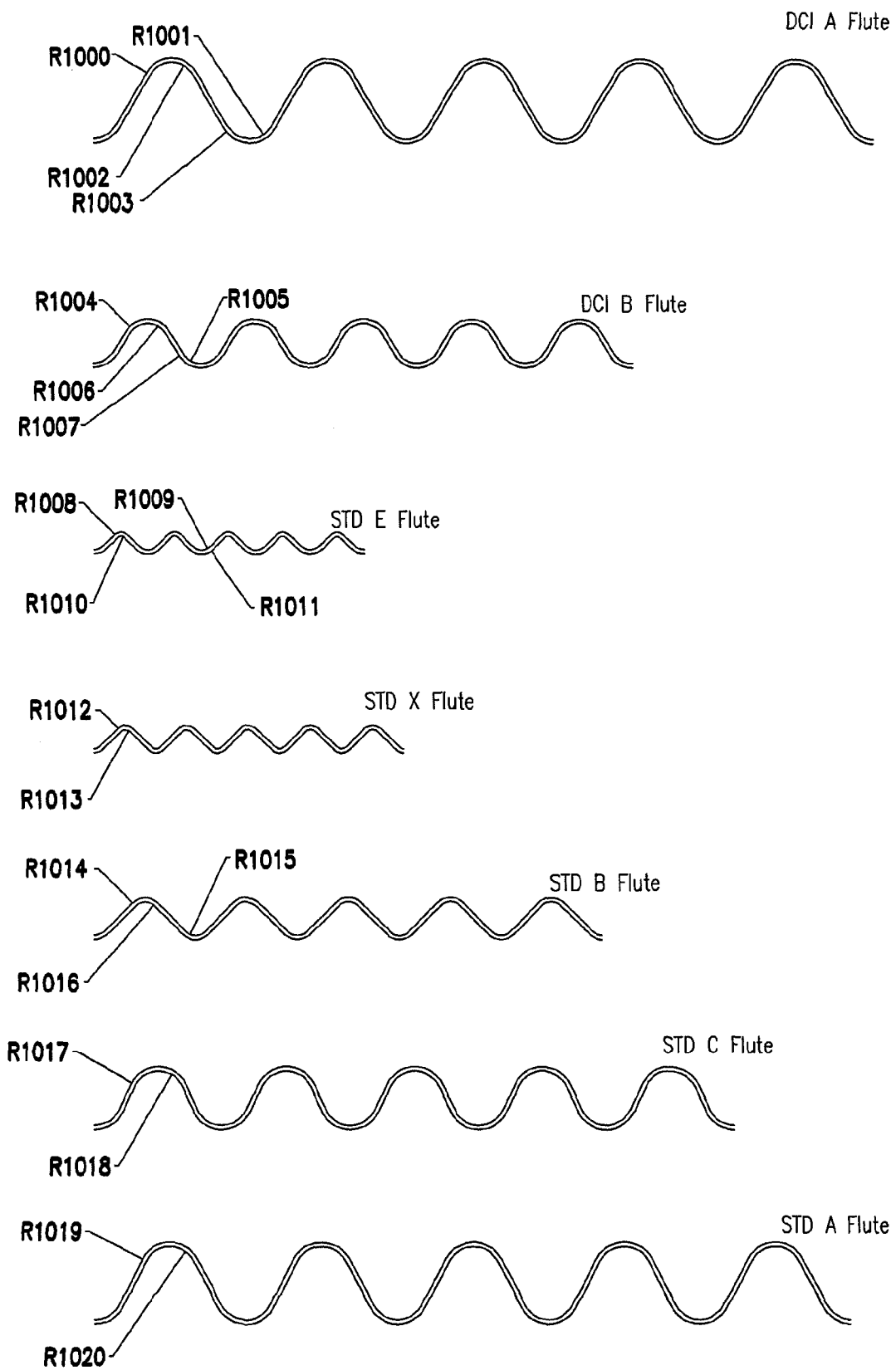
FIG. 3 is a schematic view of various selected flute shapes.

In the corrugated cardboard industry, various standard flutes have been defined. For example the standard E flute, standard X flute, standard B flute, standard C flute and standard A flute. FIG. 3, attached, in combination with Table A below provides definitions of these flutes.

Donaldson Company, Inc., (DCI) the assignee of the present disclosure, has used variations of the standard A and standard B flutes, in a variety of z-filter arrangements. These flutes are also defined in Table A and FIG. 3.

TABLE A (Flute definitions for FIG. 3)

| | |
|---|---|
| DCI A Flute: | Flute/flat = 1.52:1; The Radii (R) are as follows: R1000 = .0675 inch (1.715 mm); R1001 = .0581 inch (1.476 mm); R1002 = .0575 inch (1.461 mm); R1003 = .0681 inch (1.730 mm); |
| DCI B Flute: | Flute/flat = 1.32:1; The Radii (R) are as follows: R1004 = .0600 inch (1.524 mm); R1005 = .0520 inch (1.321 mm); R1006 = .0500 inch (1.270 mm); R1007 = .0620 inch (1.575 mm); |
| Std. E Flute: | Flute/flat = 1.24:1; The Radii (R) are as follows: R1008 = .0200 inch (.508 mm); R1009 = .0300 inch (.762 mm); R1010 = .0100 inch (.254 mm); R1011 = .0400 inch (1.016 mm); |
| Std. X Flute: | Flute/flat = 1.29:1; The Radii (R) are as follows: R1012 = .0250 inch (.635 mm); R1013 = .0150 inch (.381 mm); |
| Std. B Flute: | Flute/flat = 1.29:1; The Radii (R) are as follows: R1014 = .0410 inch (1.041 mm); R1015 = .0310 inch (.7874 mm); R1016 = .0310 inch (.7874 mm); |
| Std. C Flute: | Flute/flat = 1.46:1; The Radii (R) are as follows: R1017 = .0720 inch (1.829 mm); R1018 = .0620 inch (1.575 mm); |
| Std. A Flute: | Flute/flat = 1.53:1; The Radii (R) are as follows: R1019 = .0720 inch (1.829 mm); R1020 = .0620 inch (1.575 mm). |

Of course other, standard, flutes definitions from the corrugated box industry are known.

In general, standard flute configurations from the corrugated box industry can be used to define corrugation shapes or approximate corrugation shapes for corrugated media. Comparisons above between the DCI A flute and DCI B flute, and the corrugation industry standard A and standard B flutes, indicate some convenient variations. Other flute shapes, including ones with straight sides or side portions, are possible.

II. Manufacture of Coiled Media Configurations Using Fluted Media, Generally

Figure 4:
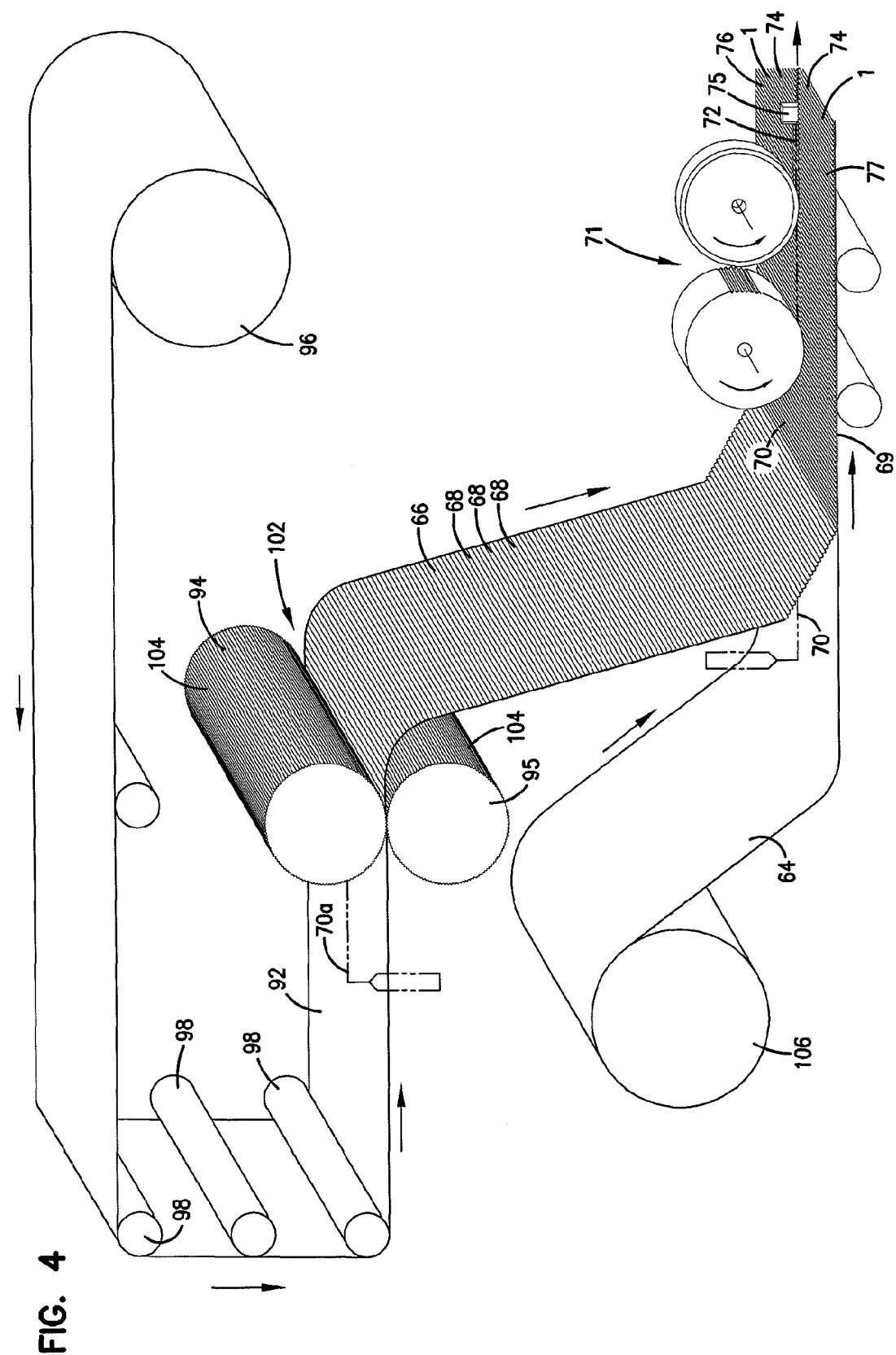
FIG. 4 is a schematic view of a process for making single facer media according to the present disclosure.

In FIG. 4, one example of a manufacturing process for making a media strip (single facer) corresponding to strip 1, FIG. 1 is shown. In general, facing sheet 64 and the fluted (corrugated) sheet 66 having flutes 68 are brought together to form a media web 69, with an adhesive bead located therebetween at 70. The adhesive bead 70 will form a single facer bead 10, FIG. 1. An optional darting process occurs at station 71 to form center darted section 72 located mid-web. The z-filter media or Z-media strip 74 can be cut or slit at 75 along the bead 70 to create two pieces 76, 77 of z-filter media 74, each of which has an edge with a strip of sealant (single facer bead) extending between the corrugating and facing sheet. Of course, if the optional darting process is used, the edge with a strip of sealant (single facer bead) would also have a set of flutes darted at this location.

Techniques for conducting a process as characterized with respect to FIG. 4 are described in PCT WO 04/007054, published Jan. 22, 2004 incorporated herein by reference.

Still in reference to FIG. 4, before the z-filter media 74 is put through the darting station 71 and eventually slit at 75, it must be formed. In the schematic shown in FIG. 4, this is done by passing a sheet of media 92 through a pair of corrugation rollers 94, 95. In the schematic shown in FIG. 4, the sheet of media 92 is unrolled from a roll 96, wound around tension rollers 98, and then passed through a nip or bite 102 between the corrugation rollers 94, 95. The corrugation rollers 94, 95 have teeth 104 that will give the general desired shape of the corrugations after the flat sheet 92 passes through the nip 102. After passing through the nip 102, the sheet 92 becomes corrugated across the machine direction and is referenced at 66 as the corrugated sheet. The corrugated sheet 66 is then secured to facing sheet 64. (The corrugation process may involve heating the media, in some instances.)

Still in reference to FIG. 4, the process also shows the facing sheet 64 being routed to the darting process station 71. The facing sheet 64 is depicted as being stored on a roll 106 and then directed to the corrugated sheet 66 to form the Z-media 74. The corrugated sheet 66 and the facing sheet 64 would typically be secured together by adhesive or by other means (for example by sonic welding).

Referring to FIG. 4, an adhesive line 70 is shown used to secure corrugated sheet 66 and facing sheet 64 together, as the sealant bead. Alternatively, the sealant bead for forming the facing bead could be applied as shown as 70*a*. If the sealant is applied at 70*a*, it may be desirable to put a gap in the corrugation roller 95, and possibly in both corrugation rollers 94, 95, to accommodate the bead 70*a*.

Of course the equipment of FIG. 4 can be modified to provide for the tack beads 20, if desired.

The type of corrugation provided to the corrugated media is a matter of choice, and will be dictated by the corrugation or corrugation teeth of the corrugation rollers 94, 95. One useful corrugation pattern will be a regular curved wave pattern corrugation, of straight flutes, as defined herein above. A typical regular curved wave pattern used, would be one in which the distance D2, as defined above, in a corrugated pattern is at least 1.2 times the distance D1 as defined above. In example applications, typically D2=1.25- 1.35×D1, although alternatives are possible. In some instances the techniques may be applied with curved wave patterns that are not "regular," including, for example, ones that do not use straight flutes. Also, variations from the curved wave patterns shown, are possible.

Figure 5:
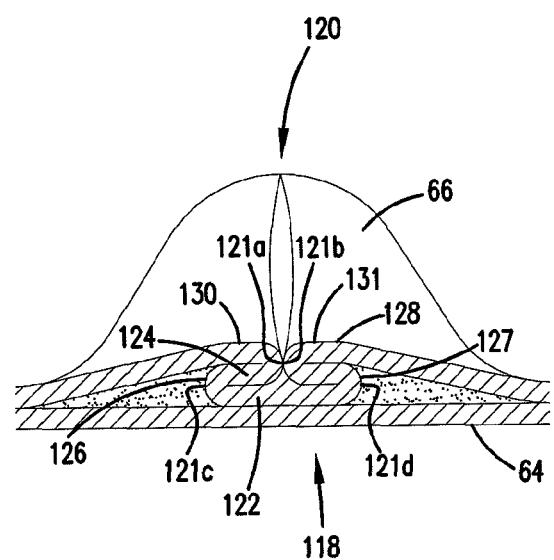
FIG. 5 is schematic, cross-sectional view of an example darted flute.

As described, the process shown in FIG. 4 can be used to create the center darted section 72. FIG. 5 shows, in cross-section, one of the flutes 68 after darting and slitting.

A fold arrangement 118 can be seen to form a darted flute 120 with four creases 121*a*, 121*b*, 121*c*, 121*d*. The fold arrangement 118 includes a flat first layer or portion 122 that is secured to the facing sheet 64. A second layer or portion 124 is shown pressed against the first layer or portion 122. The second layer or portion 124 is preferably formed from folding opposite outer ends 126, 127 of the first layer or portion 122.

Still referring to FIG. 5, two of the folds or creases 121*a*, 121*b* will generally be referred to herein as "upper, inwardly directed" folds or creases. The term "upper" in this context is meant to indicate that the creases lie on an upper portion of the entire fold 120, when the fold 120 is viewed in the orientation of FIG. 5. The term "inwardly directed" is meant to refer to the fact that the fold line or crease line of each crease 121*a*, 121*b*, is directed toward the other.

In FIG. 5, creases 121*c*, 121*d*, will generally be referred to herein as "lower, outwardly directed" creases. The term "lower" in this context refers to the fact that the creases 121*c*, 121*d* are not located on the top as are creases 121*a*, 121*b*, in the orientation of FIG. 5. The term "outwardly directed" is meant to indicate that the fold lines of the creases 121*c*, 121*d* are directed away from one another.

The terms "upper" and "lower" as used in this context are meant specifically to refer to the fold 120, when viewed from the orientation of FIG. 5. That is, they are not meant to be otherwise indicative of direction when the fold 120 is oriented in an actual product for use.

Based upon these characterizations and review of FIG. 5, it can be seen that a regular fold arrangement 118 according to FIG. 5 in this disclosure is one which includes at least two "upper, inwardly directed, creases." These inwardly directed creases are unique and help provide an overall arrangement in which the folding does not cause a significant encroachment on adjacent flutes.

A third layer or portion 128 can also be seen pressed against the second layer or portion 124. The third layer or portion 128 is formed by folding from opposite inner ends 130, 131 of the third layer 128.

Another way of viewing the fold arrangement 118 is in reference to the geometry of alternating ridges and troughs of the corrugated sheet 66. The first layer or portion 122 is formed from an inverted ridge. The second layer or portion 124 corresponds to a double peak (after inverting the ridge) that is folded toward, and in preferred arrangements, folded against the inverted ridge.

Techniques for providing the optional dart described in connection with FIG. 5, in a preferred manner, are described in PCT WO 04/007054, incorporated herein by reference. Techniques for coiling the media, with application of the winding bead, are described in PCT application US04/ 07927, filed Mar. 17, 2004 and incorporated herein by reference.

Alternate approaches to darting the fluted ends closed are possible. Such approaches can involve, for example, darting which is not centered in each flute, and rolling or folding over the various flutes. In general, darting involves folding or otherwise manipulating media adjacent to fluted end, to accomplish a compressed, closed, state.

Techniques described herein are particularly well adapted for use in media packs that result from a step of coiling a single sheet comprising a corrugated sheet/facing sheet combination, i.e., a "single facer" strip.

Coiled media pack arrangements can be provided with a variety of peripheral perimeter definitions. In this context the term "peripheral, perimeter definition" and variants thereof, is meant to refer to the outside perimeter shape defined, looking at either the inlet end or the outlet end of the media pack. Typical shapes are circular as described in PCT WO 04/007054 and PCT application US 04/07927. Other useable shapes are obround, some examples of obround being oval shape. In general oval shapes have opposite curved ends attached by a pair of opposite sides. In some oval shapes, the opposite sides are also curved. In other oval shapes, sometimes called racetrack shapes, the opposite sides are generally straight. Racetrack shapes are described for example in PCT WO 04/007054 and PCT application US04/07927, each of which is incorporated herein by reference.

Another way of describing the peripheral or perimeter shape is by defining the perimeter resulting from taking a cross-section through the media pack in a direction orthogonal to the winding access of the coil.

Opposite flow ends or flow faces of the media pack can be provided with a variety of different definitions. In many arrangements, the ends are generally flat and perpendicular to one another. In other arrangements, the end faces include tapered, coiled, stepped portions which can either be defined to project axially outwardly from an axial end of the side wall of the media pack; or, to project axially inwardly from an end of the side wall of the media pack.

The flute seals (for example from the single facer bead, winding bead or stacking bead) can be formed from a variety of materials. In various ones of the cited and incorporated references, hot melt or polyurethane seals are described as possible for various applications.

Figure 6:
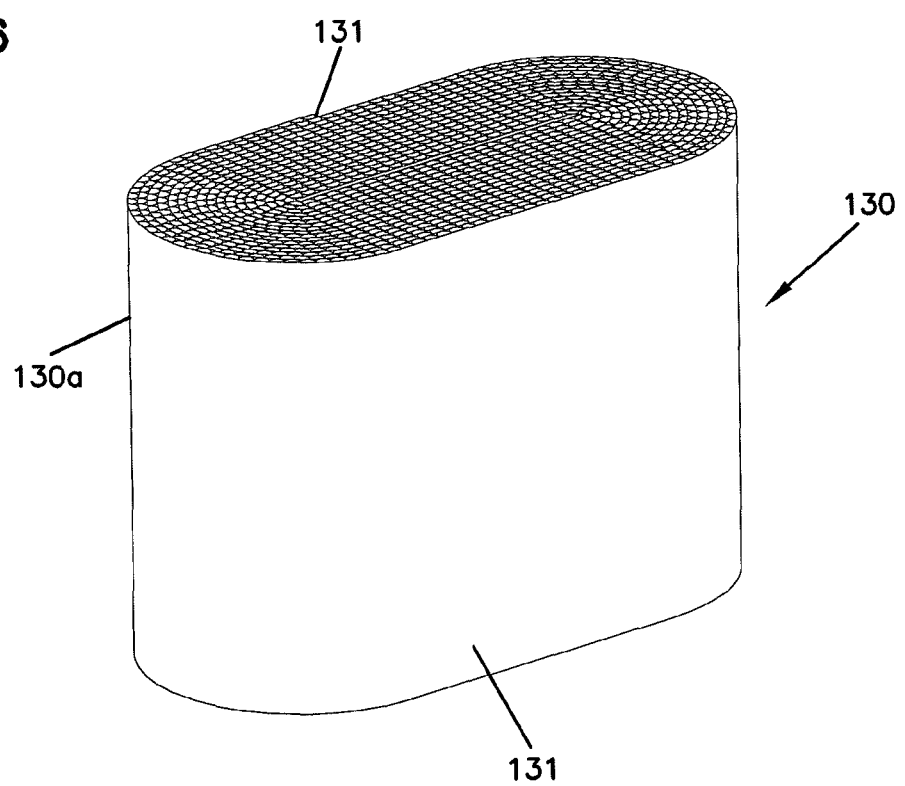
FIG. 6 is schematic, perspective view of a coiled media construction comprising a coiled sheet of single facer material.

Reference numeral 130, FIG. 6, generally indicates a coiled media pack 130. The coiled media pack 130 comprises a single strip 130a of single facer material comprising a fluted sheet secured to facing sheet coiled around a center. Typically, the coiling is with facing sheeting directed outwardly. As previously described, in general a single facer bead and winding bead would be used, to provide flute seals within the media.

The particular coiled media pack 130 depicted comprises an oval media pack 131. It is noted that the principles described herein, however, can be applied starting with the media pack having a circular configuration.

Figure 7:
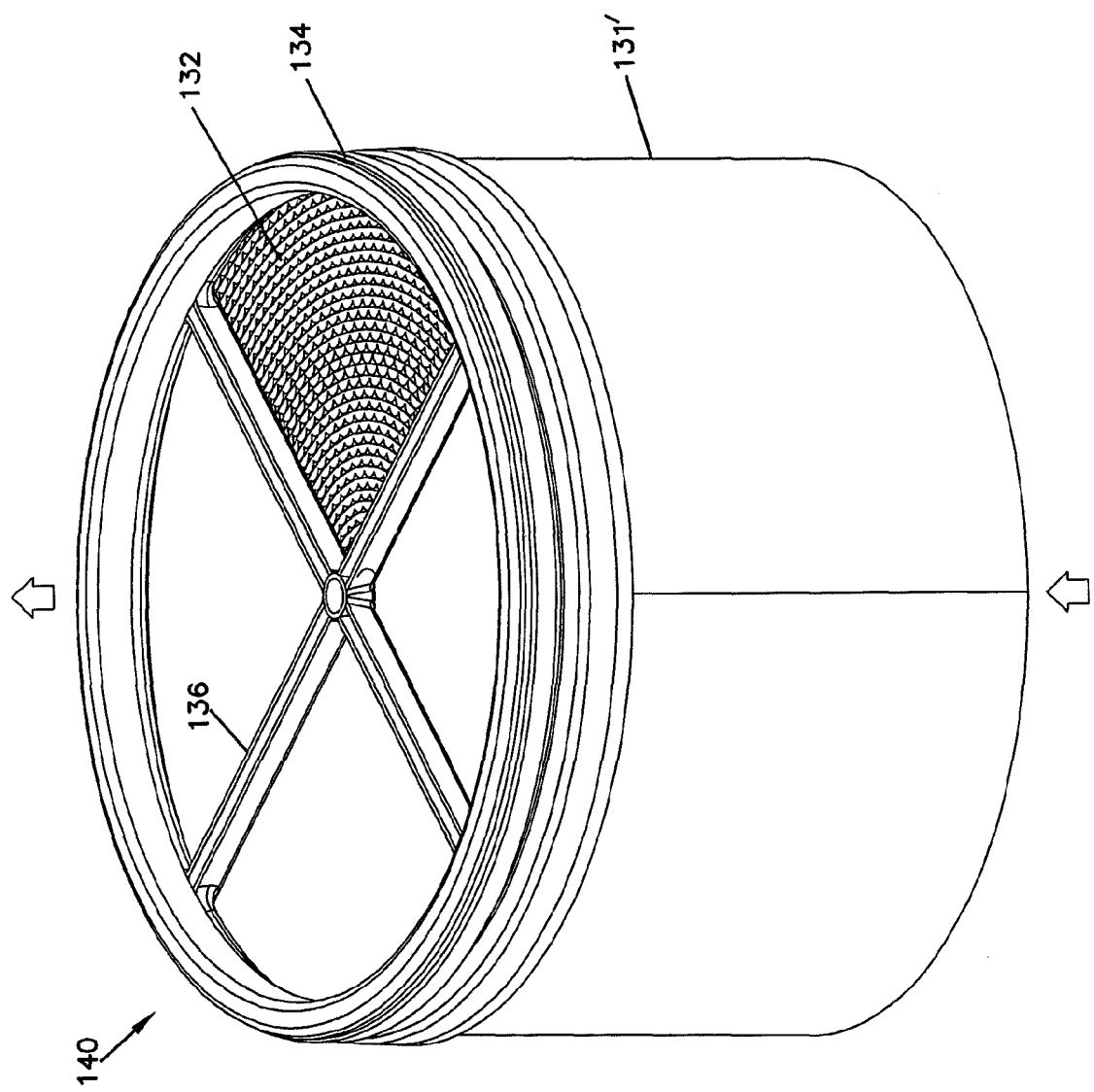
FIG. 7 is a schematic, perspective view of a coiled media construction forming a filter element comprising a coiled sheet of single facer material and having a seal member secured thereto.

A filter element or cartridge 140 is depicted in FIG. 7. It shows an example of a circular configuration for the media pack 131'. Media pack 131' is cylindrical in shape, with a circular cross-section. Only a portion of the flutes of the upper flow face 132 is depicted; it should be understood that the entire upper flow face 132 should appear to have fluted media. In FIG. 7, a seal member 134 is secured to the media pack 131'. In the particular embodiment shown in FIG. 7, the seal member 134 functions as a radial seal as described in U.S. Pat. No. 6,350,291 or U.S. Pat. No. 7,396,376, each incorporated by reference herein.

FIG. 7 also shows a face grid 136 to help support the seal member 134 and the media pack 131'.

Figure 8:
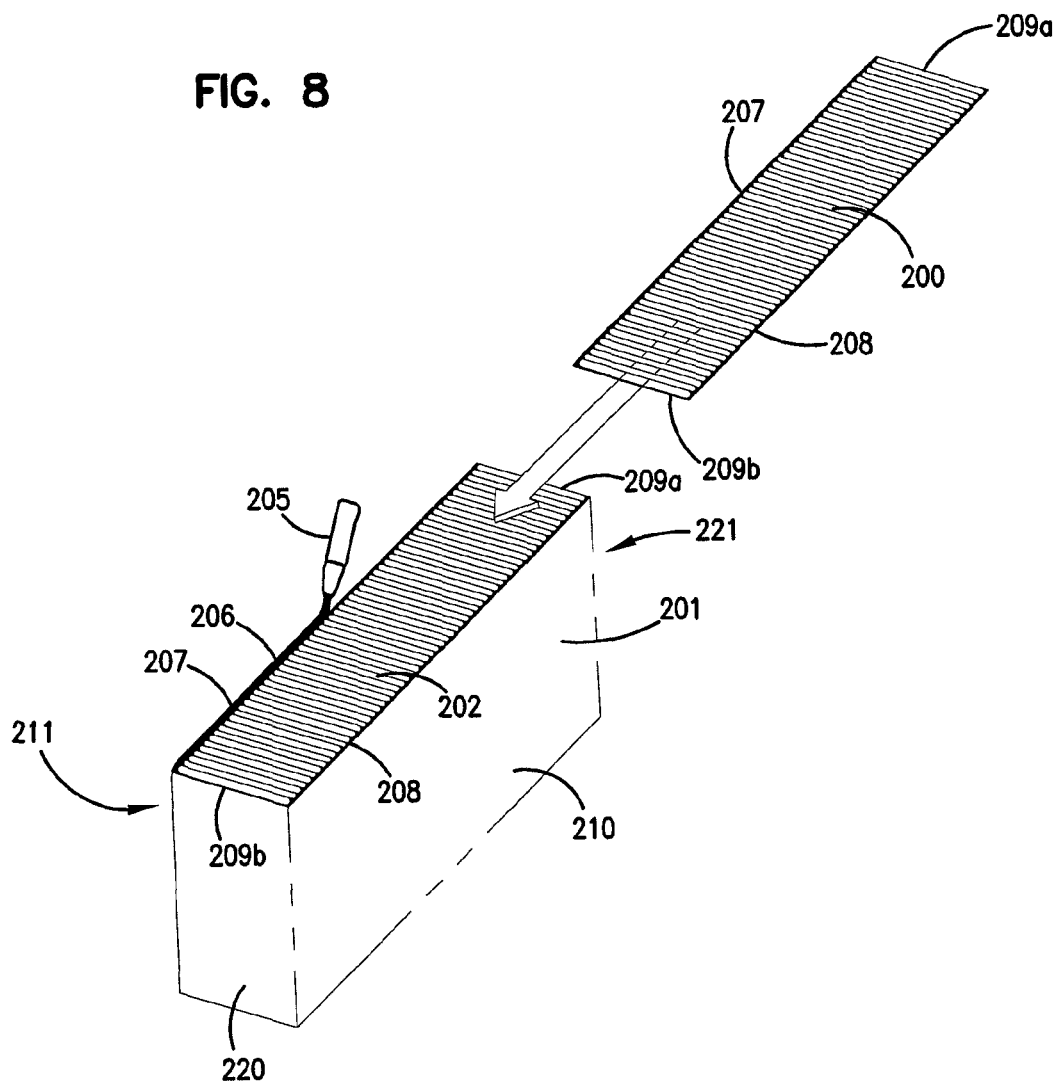
FIG. 8 is a schematic depiction of a step of creating a stacked z-filter media pack.

In FIG. 8, schematically there is shown a step of forming a stacked z-filter media pack from strips of z-filter media, each strip being a fluted sheet secured to a facing sheet. Referring to FIG. 8, single facer strip 200 is being shown added to a stack 201 of strips 202 analogous to strip 200. Strip 200 can be cut from either of strips 76, 77, FIG. 4. At 205, FIG. 8, application of a stacking bead 206 is shown, between each layer corresponding to a strip 200, 202 at an opposite edge from the single facer bead or seal. (Stacking can also be done with each layer being added to the bottom of the stack, as opposed to the top.)

Referring to FIG. 8, each strip 200, 202 has front and rear edges 207, 208 and opposite side edges 209a, 209b. Inlet and outlet flutes of the corrugated sheet/facing sheet combination comprising each strip 200, 202 generally extend between the front and rear edges 207, 208, and parallel to side edges 209a, 209b.

Still referring to FIG. 8, in the media pack 201 being formed, opposite flow faces are indicated at 210, 211. The selection of which one of faces 210, 211 is the inlet end face and which is the outlet end face, during filtering, is a matter of choice. In some instances the stacking bead 206 is positioned adjacent the upstream or inlet face 211; in others the opposite is true. The flow faces 210, 211, extend between opposite side faces 220, 221.

The stacked media pack 201 shown being formed in FIG. 8, is sometimes referred to herein as a "blocked" stacked media pack. The term "blocked" in this context, is an indication that the arrangement is formed to a rectangular block in which all faces are 90° relative to all adjoining wall faces. Alternate configurations are possible. For example, in some instances the stack can be created with each strip 200 being slightly offset from alignment with an adjacent strip, to create a parallelogram or slanted block shape, with the inlet face and outlet face parallel to one another, but not perpendicular to upper and bottom surfaces.

In some instances, media pack 201 will be referenced as having a parallelogram shape in any cross-section, meaning that any two opposite side faces extend generally parallel to one another.

It is noted that a blocked, stacked arrangement corresponding to FIG. 8 is described in the prior art of U.S. Pat. No. 5,820,646, incorporated herein by reference. It is also noted that stacked arrangements are described in U.S. Pat. Nos. 5,772,883; 5,792,247; U.S. PCT WO 04/071616, published Aug. 26, 2004; and U.S. Pat. No. 7,282,075. Each of these four latter references is incorporated herein by reference, in it entirety. It is noted that the stacked arrangement shown in U.S. Pat. No. 7,282,075, is a slanted stacked arrangement.

Figure 9:
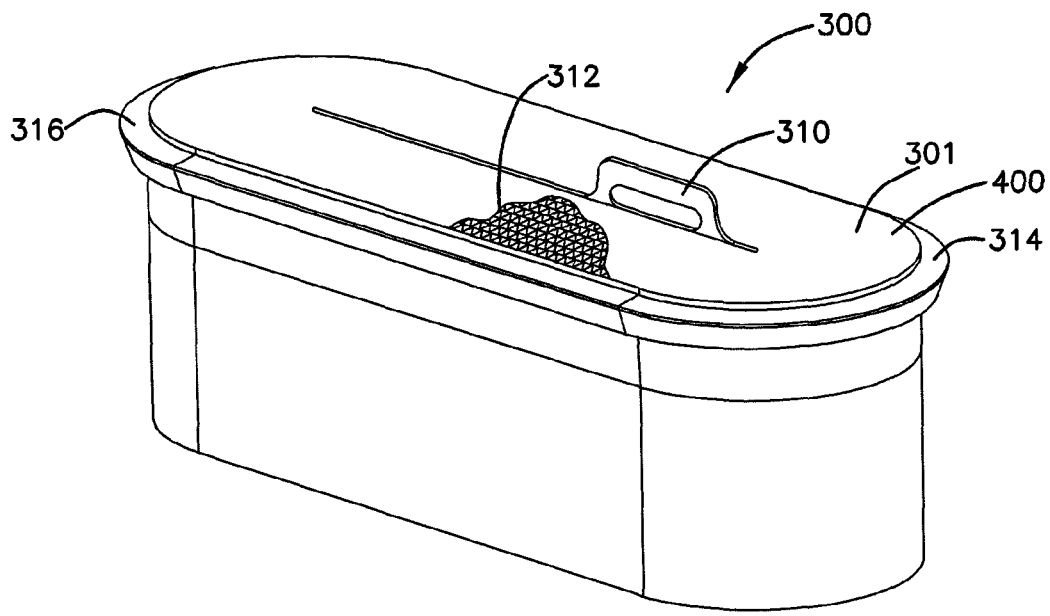
FIG. 9 is a perspective view of a filter element comprising a coiled sheet of single facer material and having a seal member secured thereto, the element having a first composition of media.
Figure 10:
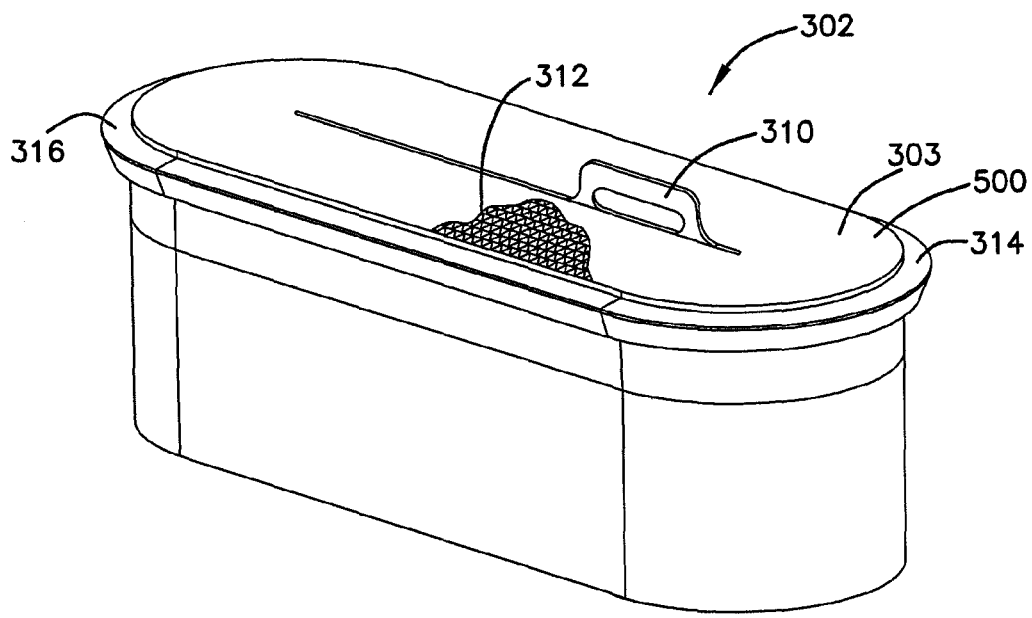
FIG. 10 is a perspective view of a filter element comprising a coiled sheet of single facer material and having a seal member secured thereto, the element having a second composition of media.

FIGS. 9 and 10 are perspective views of filter elements or cartridges 300, 302 made from coiled media 301, 303, coiled around a centerboard having a handle 310 projecting from flow face 312. The elements 300, 302 have a seal member 314 secured thereto; and in the embodiment shown, the seal member 314 is secured to the outer periphery of the elements 300, 302 adjacent to the flow face 312. In the embodiment shown, the seal member 314 is a pinch seal member 316, in that a seal is formed by an axial compression or force on opposing axial surfaces. Coiled media 301, 303 use standard A-flutes having the following dimensions: major axis 22.37 inch; minor axis 7.56 inch; depth 7.0 inch. Elements 300 and 302 differ from one another in the particular composition of the media 301, 303 as described further below.

III. Application of Nanofibers for Coiled Media

In the embodiments shown, Elements 300 and 302 include a fine fiber layer, such as a nanofiber layer 420, 520. The term "fine fiber" indicates a fiber having a fiber size or diameter of 0.001 to less than 5 microns or about 0.001 to less than 2 microns and, in some instances, 0.001 to 0.5 micron diameter. A variety of methods can be utilized for the manufacture of fine fiber. Gillingham et al., U.S. Pat. No. 7,090,712; Gillingham et al., U.S. Pat. No. 6,974,490; Chung et al., U.S. Pat. No. 6,743,273; Gillingham et al., U.S. Pat. No. 6,673,136; Kahlbaugh et al., U.S. Pat. No. 5,423,892; McLead, U.S. Pat. No. 3,878,014; Barris, U.S. Pat. No. 4,650,506; Prentice, U.S. Pat. No. 3,676,242; Lohkamp et al., U.S. Pat. No. 3,841,953; and Butin et al., U.S. Pat. No. 3,849,241; U.S. Patent Publication No. 20050095695, and WO06/094076, all of which are incorporated by reference herein, disclose a variety of fine fiber technologies. The fine fiber of the invention is typically electrospun onto a substrate, such as substrate 410, 510 shown in FIGS. 13 and 14, respectively. The substrate can be a pervious or impervious material. In filtration applications, non-woven filter media can be used as a substrate.

IV. Static Dissipative Filter Element Using Fluted Media

As mentioned above, control of static electricity can be of great importance in many industrial settings where an uncontrolled electrostatic discharge (ESD) or spark can result in serious damage. The element 300 of FIG. 9 and element 302 of FIG. 10 use static-dissipative media materials according to this disclosure which are designed to prevent uncontrolled ESD. Element 300 has a coiled media 301 which utilizes media 400, abbreviated herein as SD 1, while element 302 has a coiled media 303 which utilizes media 500, abbreviated herein as SD 2. Media 400 and 500 are both for filtering an air or liquid stream while simultaneously preventing unintended electrostatic discharge. Additionally, media 400 and 500 are also suitable for formation into fluted filter media.

Figure 13:
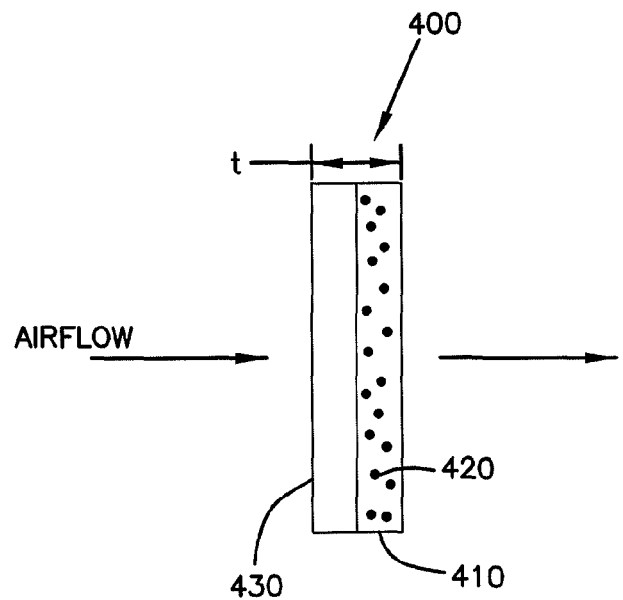
FIG. 13 is a schematic cross-section of one embodiment of media used in the filter element of FIG. 9.
Figure 14:
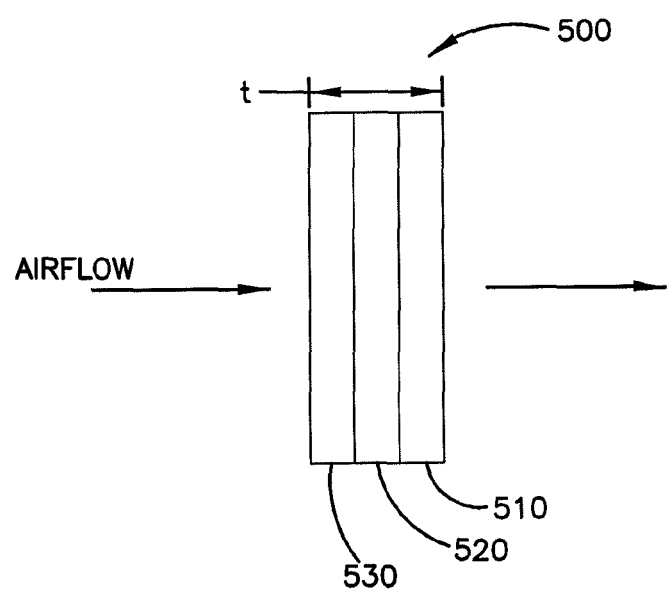
FIG. 14 is a schematic cross-section of one embodiment of media used in the filter element of FIG. 10.

Referring to FIGS. 13 and 14, a schematic cross-section of media 400 and media 500 is shown, respectively. As shown, media 400, 500 include a substrate layer 410, 510. Substrate layer 410, 510 may be formed from many possible combinations of suitable components. For example, substrate layer 410, 510 can include organic fibers, such as cellulose, synthetic fibers, such as polyester, or a combination of both organic and synthetic fibers. Any relative combination of organic and synthetic fibers may be used for substrate layer 410, 510 depending upon the desired performance and cost parameters for the end product. Substrate layer 410, 510 also includes a solvent or aqueous based binder resin. When substrate layer 410, 510 is formed from a wet-laid process, the fibers and resin are mixed together to form a slurry, or another fluidized state, and are subsequently formed into a sheet for later drying. An exemplary wet-laid process for forming a substrate is described in *Handbook of Nonwoven Filter Media* by Larry C. Wadsworth, Ph.D. (Elsevier Ltd. 2007), hereby incorporated in its entirety by reference. Exemplary methods for making wet-laid media are disclosed in US Publication 2007/0039300 and U.S. Pat. No. 7,314,497 to Kahlbaugh, both references being incorporated in their entirety herein. Substrate layer 510 may also be formed from any other process known to those having ordinary skill in the art. Many combinations and types of resins and fibers suitable for use in substrate 410, 510 are possible. For example, in some embodiments, there will be at least 70% by weight organic fibers, in other embodiments there will be at least 80% organic fibers, and in still further embodiments there will be at least 90% organic fibers. Additionally, it is possible to incorporate metallic fibers into substrate layer 410, 510. In some embodiments, substrate layer 410, 510 will have no more than 5% by weight metallic fibers, and in other embodiments no metallic fibers present. In the particular embodiments shown in FIGS. 9-10 and 13-14, substrate layer 410, 510 includes about 80% by weight cellulosic fibers and about 20% by weight aqueous resin, exclusive of the weight of any additional dissipative material.

Still referring to FIGS. 13 and 14, media 400, 500 may also include a nanofiber layer 430, 530. Nanofiber layer 430, 530 can be applied directly to substrate layer 410, as is the case for media 400, or an intermediate layer, as is the case with media 500. The nanofiber layer can be manufactured and applied in accordance with the description provided in the preceding section and the publications cited within that section.

Referring again to FIGS. 13 and 14, media 400, 500 is shown as including dissipative material 420, 520. Dissipative material 420, 520 is for imparting a static charge dissipative property to media 400, 500 by lowering the surface resistivity of media 400, 500. By use of the term "static charge dissipative property", it is meant that a dissipative material 420, 520 is added to media 400, 500 in an amount sufficient to lower the surface resistivity of media 400, 500 to at least below $1\times10^9$ ohms per square ($\Omega$/sq) at 23° C. and 50% relative humidity. Surface resistivity is determined by following ESD Association test procedure: *Surface Resistance measurement of Static-Dissipative Planar Materials EOS/ESD S11.11-1993* or a similar test. This type of test procedure yields a value for surface resistance, from which surface resistivity can be calculated by multiplying the measured surface resistance by ten. For reference, typical filter media having nanofibers on a substrate with 80% weight cellulose fibers and 20% weight aqueous resin, but without the inclusion of a dissipative material, will generally have a surface resistivity of at least $1\times10^{10}$ $\Omega$/sq. Instead of having the desired dissipative effect, a filter media with a surface resistivity above $1\times10^9$ $\Omega$/sq will generally be either insulative or insufficiently dissipative to prevent uncontrolled ESD.

One manner in which a dissipative material can be incorporated into a media is represented in the embodiment shown in FIG. 13. In this embodiment, dissipative material 420 may be added to the fluidized fiber and resin mixture prior to sheet formation. Alternatively, dissipative material 420 can be added directly to the resin before being brought into contact with the fibers. Either approach allows for dissipative material 420 to be evenly distributed throughout substrate 410 once the substrate is cured. Once substrate 410 is formed with dissipative material 420 therein, the nanofiber layer 430 may be applied as previously described to form media 400. One example of a dissipative material 420 is carbon black. By adding a sufficient quantity of carbon black to an 80% weight cellulose fiber, 20% weight aqueous resin mixture, the surface resistivity of media 400 can be lowered to $6.1\times10^7$ $\Omega$/sq on the nanofiber layer 430 side and to $1.9\times10^7$ $\Omega$/sq on the opposite side. Applicants directly measured the surface resistance for this embodiment using a Trek Model 152-1 Resistance meter while following guidelines similar to those set forth in EOS/ESD S11.11-1993. It should be appreciated that, by altering the amount of dissipative material 420 incorporated into substrate 410, various surface resistivities can be achieved, as desired.

Another manner in which a dissipative material can be incorporated into a media is represented in the embodiment shown in FIG. 14. In this embodiment, dissipative material 520 is added directly to the surface of substrate 510. One example of a dissipative material 520 is a metallic coating, for example an aluminum coating. An aluminum coating can be created by depositing aluminum on the surface of substrate 510 via a vapor deposition process. Once dissipative material 520 has been deposited, the nanofiber layer 530 may be applied thereon as previously described to form media 500. By adding a sufficient quantity of aluminum to an 80% weight cellulose fiber, 20% weight aqueous resin media, the surface resistivity of media 500 can be lowered to $3.3\times10^8$ $\Omega$/sq on the side of media 500 onto which the aluminum is deposited. Applicants directly measured the surface resistance for this embodiment using a Trek Model 152-1 Resistance meter while following the guidelines similar to those set forth in EOS/ESD S11.11-1993. It should be appreciated that, by altering the amount of dissipative material 520 deposited onto substrate 510, various surface resistivities can be achieved, as desired.

Figure 11:
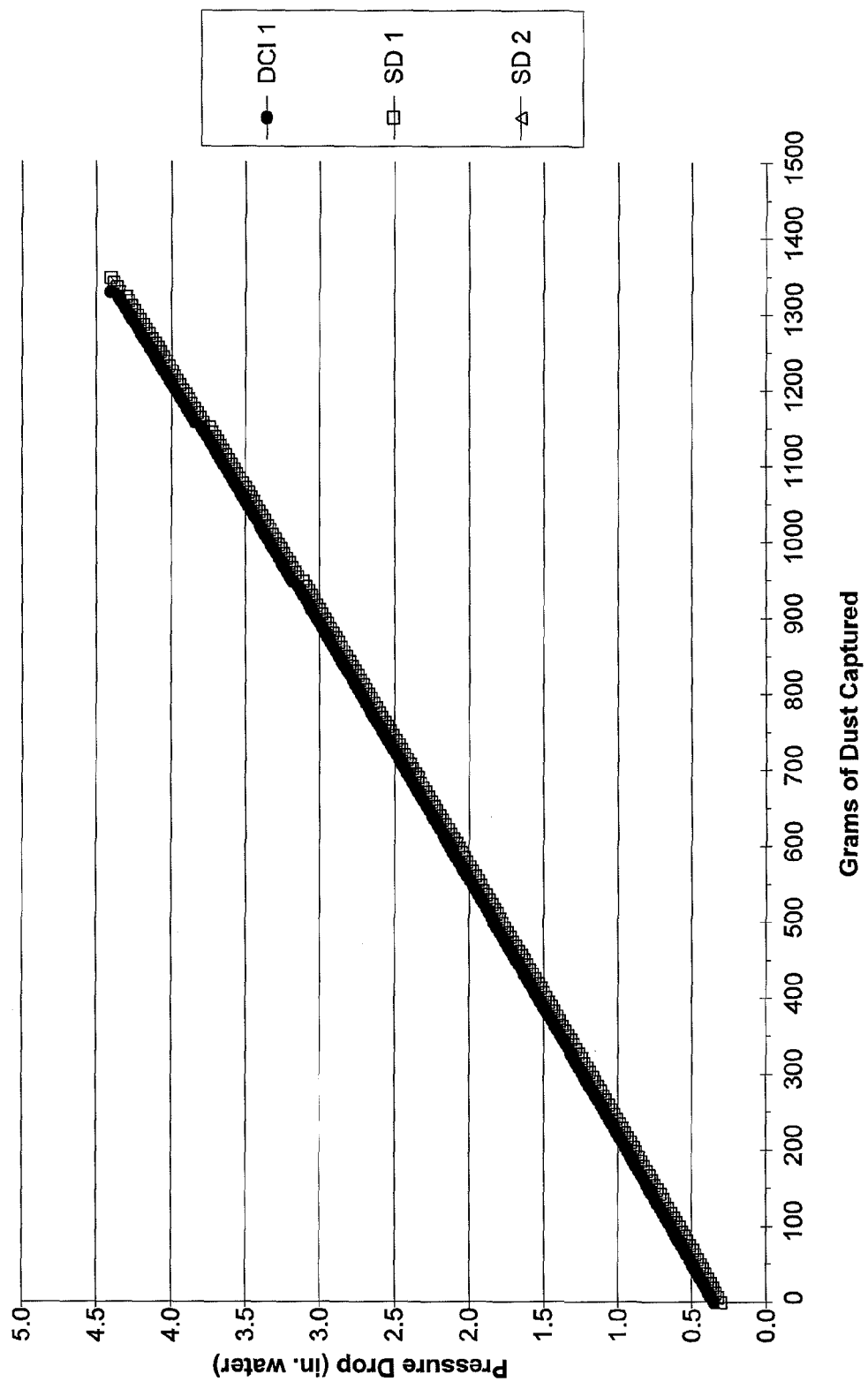
FIG. 11 is a graph showing pressure drop and dust capacity for filter elements.

One advantage that media 400 and 500, as described above, have over other filter media with static dissipative characteristics is a relatively small thickness, t, as shown in FIGS. 13 and 14. For example, a typical filter media having 80% weight cellulose fibers and 20% weight aqueous resin, but without the inclusion of a dissipative material, will generally have a thickness ranging from 0.011 to 0.012 inch under a pressure of 1.5 pounds per square inch (psi). This standard media is frequently used in fluted filter arrangements, such as coiled media and is abbreviated as DCI 1 herein. With the inclusion of dissipative material 420, 520, the thickness of the media 400, 500 is also about 0.011 to 0.012 inch under a pressure of 1.5 psi, meaning that the inclusion of dissipative material 420, 520 has a negligible impact on overall media thickness. Referring to FIG. 11, a chart is shown correlating pressure drop and dust capacity for: DCI 1 in a configuration similar to that shown for filter elements 300, 302; filter element 300 using media 400 (SD 1); and filter element 302 using media 500 (SD 2). This chart shows that the pressure drop is virtually identical for DCI 1, SD 1 (media 400) and SD 2 (media 500), as the chart appears to show one line instead of three distinct lines because the actual pressure drop differences are almost indistinguishable.

Figure 12:
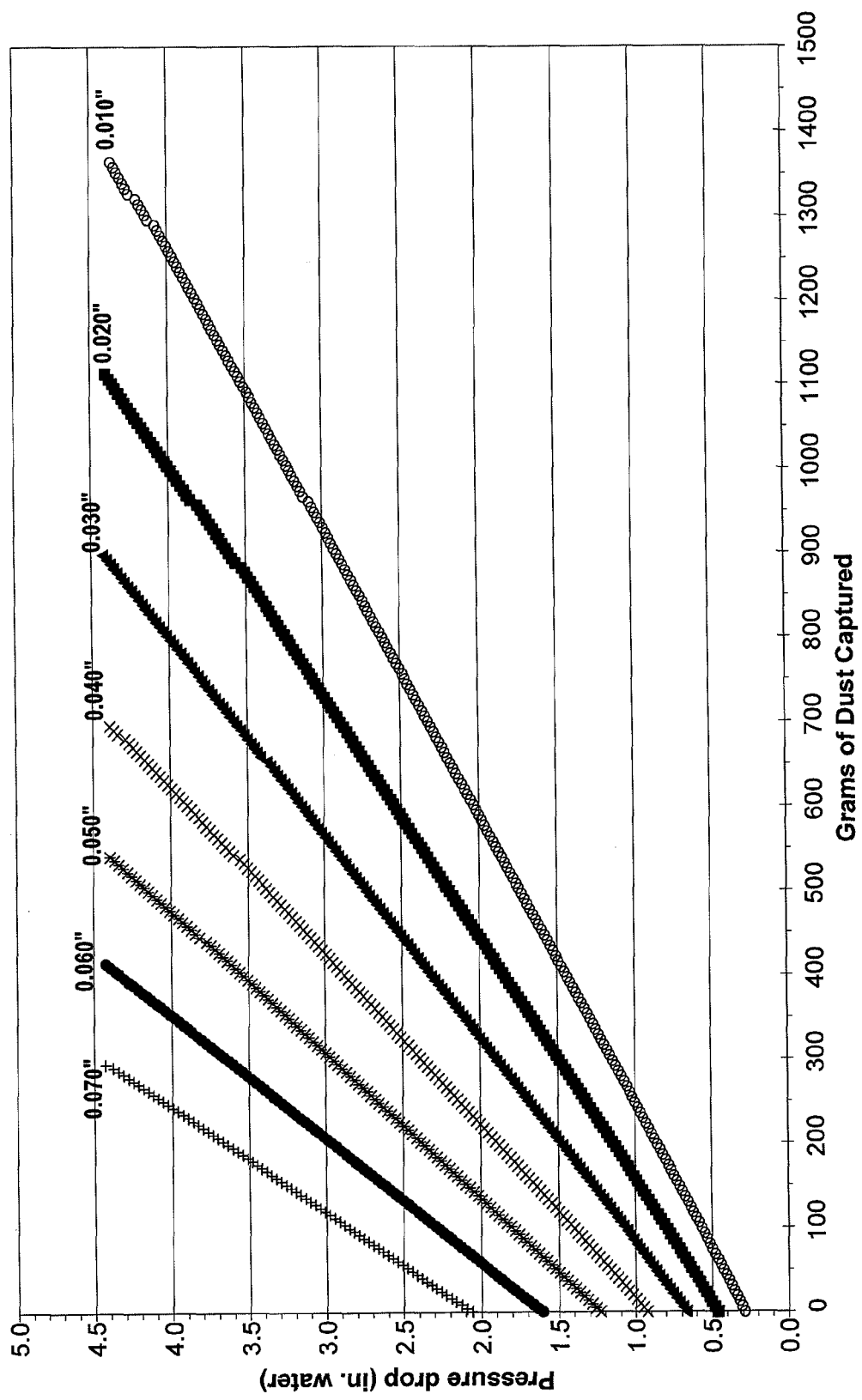
FIG. 12 is a graph showing effect of media layer thickness on element pressure drop and dust capacity.

In comparison to media 400 and 500, prior art filter media that can be categorized as being sufficiently dissipative to prevent unintentional ESD have considerably greater thicknesses. For example, a filter media, herein abbreviated as CM 1, constructed from a nanofiber layer and a conductive substrate sold by Hollingsworth and Vose Company (H&V grade FC 2281) has a thickness of about 0.030 inch. Another filter media sold by Hollingsworth and Vose Company (H&V grade 5010V2), herein abbreviated as CM 2, is formed from activated carbon powder in a polyester matrix and has a thickness of about 0.060 inch. The significance of media thickness is illustrated in FIG. 12 which shows the effect of media layer thickness on element pressure drop and dust holding capacity (at 400 cubic feet per minute using ISO fine test dust: ISO 12103-A2 Fine and at a particulate concentration of 155.45 pounds per cubic foot). As can be readily seen in FIG. 12, the amount of dust captured at any given pressure drop reduces significantly as media thickness is increased. Conversely, the pressure drop at any given dust capture quantity significantly increases as media thickness is increased. For example, the pressure drop for 0.010 inch thick media at 400 grams of captured dust is about 1.5 inches of water, while the corresponding pressure drop for 0.030 inch thick media is about 2.3 inches of water. The pressure drop for 0.030 inch thick media under the same conditions is about 4.4 inches of water. For most industrial filter applications, it is desired that the filter element have a pressure drop of 2 to 4 inches of water before requiring cleaning or replacing the element. As such, the maximum acceptable filter media thickness is generally about 0.020 inch for most applications. Accordingly media CM 1 and CM 2, and similar filters, are not suitable for typical high efficiency industrial filter applications while media 400 and 500 are well within the acceptable thickness.

Another advantage that media 400 and 500, have over other filter media with static dissipative characteristics is a high particulate removal efficiency. Just as the addition of dissipative material 420, 520 has a negligible impact on media thickness, the addition of dissipative material 420, 520 also has a neglible impact on particulate removal efficiency. As such, media 400 and 500 both have particulate removal efficiencies of 65% to 70% (for 0.76 micron particles at 20 feet per minute) and a Frazier permeability between 18.6 and 18.7. This efficiency is identical to the removal efficiency for filter media DCI 1. In contrast, CM 1 has a particulate removal efficiency in the range of 45% to 55% while CM 2 has a particulate removal efficiency in the range of only 10% to 15%. Accordingly, both CM 1 and CM 2 are not suitable for high efficiency filtering applications where a minimum particulate removal efficiency of 60% is required. This is also true of filter media having activated carbon fibers in the 70% to 80% weight range which have a removal efficiency of only about 15% to 20% and are insulative in nature.

Other advantages that media 400, 500 have over other prior art static dissipative filters is low cost and formability. Because media 400, 500 can be constructed from over 70% cellulose fibers, they are relatively inexpensive to manufacture. In comparison, CM 1 has a content of less than 70% cellulose while CM 2 has no cellulose fibers. Additionally, CM 2 is not suitable for forming fluted media due to its high concentration of carbon particles because the particles would shed and be crushed during the flute forming process. While it is unknown if CM 1 is formable into fluted media, its large thickness would make it less suitable for such an application as compared to media 400, 500.

Following the principles outlined herein, a filter element with fluted media can be produced that provides: protection from build-up of electrical charges; a high removal efficiency of particulates; a low pressure drop during operation; a high storage capacity for contaminants; and capabilities for being cleaned, either by reverse air, pulsed air, spray washing or other methods. Such a filter element is suitable for a wide variety of industrial air and liquid filtration applications, one example being dust collection. An exemplary dust collector is described in WO 2009/124284 published on Oct. 8, 2009, incorporated by reference herein in its entirety.

The above is a description of examples and principles. Many embodiments can be made utilizing these principles. It is noted that not all the specific features described herein need to be incorporated in an arrangement for the arrangement to have some selected advantage according to the present disclosure.

We claim:
1. An air filter cartridge comprising:
(a) filter media formed by dissipative material added into a resin and brought into contact with cellulose fibers, the filter media forming a filter media pack comprising fluted media secured to facing media;
  (i) the dissipative material imparting a static charge dissipative property thereto, the dissipative material being evenly distributed throughout the filter media;
  (ii) the filter media pack being constructed with an efficiency at least 60%, for 0.76 micron particles at a face velocity of 20 feet/min.;
  (iii) the fluted media has a thickness of no more than 0.020 inches;
  (iv) the filter media pack includes at least 70% cellulose fibers by weight; and
  (v) the fluted media is provided with two sides each having a surface resistivity of less than $1 \times 10^9$ ohms/square.

2. An air filter cartridge according to claim 1 wherein:
(a) the dissipative material is carbon black.

3. An air filter cartridge according to claim 1 wherein:
(a) the fluted media comprises no more than 0.5%, by weight, electrically conductive fiber.

4. An air filter cartridge according to claim 1 wherein:
(a) the fluted media comprises no electrically conductive fiber.

\* \* \* \* \*